(12) United States Patent
Bourgeois et al.

(10) Patent No.: US 9,148,025 B2
(45) Date of Patent: Sep. 29, 2015

(54) SYSTEM AND METHOD FOR A RECHARGEABLE BATTERY

(75) Inventors: Richard Scott Bourgeois, Albany, NY (US); Vincent Boccanfuso, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 436 days.

(21) Appl. No.: 13/557,676

(22) Filed: Jul. 25, 2012

(65) Prior Publication Data
US 2014/0028268 A1  Jan. 30, 2014

(51) Int. Cl.
*H02J 7/04* (2006.01)
*H02J 7/16* (2006.01)
*H02J 7/00* (2006.01)

(52) U.S. Cl.
CPC .......................................... *H02J 7/00* (2013.01)

(58) Field of Classification Search
CPC .... H02J 7/007; H02J 7/0054; G01R 31/3606; G01R 31/3624; G01R 31/362; G01R 31/361; G01R 31/3634; G01R 31/3658; G01R 31/3662; B60L 11/1862
USPC ......... 320/104, 148–152, 156–157, 160–162, 320/164–165
See application file for complete search history.

(56) References Cited

U.S. PATENT DOCUMENTS

| | | | | |
|---|---|---|---|---|
| 5,166,595 | A | * | 11/1992 | Leverich ........................ 320/139 |
| 5,691,623 | A | | 11/1997 | Tsantillis |
| 6,356,083 | B1 | | 3/2002 | Ying |
| 8,294,425 | B2 | * | 10/2012 | Aradachi et al. ............... 320/116 |

* cited by examiner

*Primary Examiner* — Nghia Doan
(74) *Attorney, Agent, or Firm* — Dority & Manning, P.A.

(57) ABSTRACT

A method for a rechargeable battery is disclosed that includes applying a charge voltage to the rechargeable battery; monitoring a battery voltage and a battery current of the rechargeable battery; and identifying a top of charge condition when for a defined time period the battery voltage is within a voltage tolerance of the charge voltage and the battery current is within a current tolerance of a threshold current. Also disclosed is a rechargeable battery system.

25 Claims, 3 Drawing Sheets

SYSTEM AND METHOD FOR A RECHARGEABLE BATTERY

BACKGROUND

1. Technical Field

Embodiments of the subject matter disclosed herein relate to rechargeable batteries and methods of recharging rechargeable batteries.

2. Dicussion of Art

In some situations, how a rechargeable battery is charged and discharged may result in undesired battery performance and premature deterioration of the electrochemical cells of the battery. For example, repeated over or under charging of a rechargeable battery may damage its electrochemical cells. Over charging batteries has also lead to battery failures. In prior systems, a battery has been recharged by applying a voltage to the battery and charging until the battery ceases to draw current from the charging source. Such systems have been susceptible to changes in the charge voltage that have led to over and under charging and reduced performance. In other systems, the total charge in the battery is monitored by integrating current to and from the battery. However such systems have required precise current measurement that substantially increases the cost of a rechargeable battery system. Moreover, the magnitude of errors in the monitored charge of the battery tends to increase over time through successive charge and discharge cycles resulting in reduced battery performance. Other systems have relied upon a correlation between a battery's open circuit voltage and state of charge to assess the total energy stored within the battery. However for some batteries, the open circuit voltage does not correlate well to the total energy stored. These prior systems have not provided a consistent indication of the useful power contained in the battery, which has adversely affected the efficiency of the charge and discharge operations.

It may therefore be desirable to have a rechargeable battery and/or a method for a rechargeable battery that differ from those that are currently available.

BRIEF DESCRIPTION

A method for a rechargeable battery is disclosed. In embodiments, the method includes applying a charge voltage to the rechargeable battery; monitoring a battery voltage and a battery current of the rechargeable battery; and identifying a top of charge condition when for a defined time period the battery voltage is within a voltage tolerance of the charge voltage and the battery current is within a current tolerance of a threshold current.

In another embodiment, the method includes establishing a state of charge of the rechargeable battery when the top of charge condition is identified. In another embodiment, the state of charge corresponds to a known available energy capacity of the rechargeable battery. In another embodiment, the charge voltage is a float voltage of the rechargeable battery, and wherein the state of charge is established as 100%. In another embodiment, the charge voltage is not a float voltage of the rechargeable battery, and the state of charge is established based on the charge voltage and the float voltage. In another embodiment, the method includes ceasing to charge the rechargeable battery when the top of charge condition is identified. In another embodiment, the defined time period is no more than 120 seconds. In another embodiment, the voltage tolerance is no more than 10 millivolts per cell of the rechargeable battery. In another embodiment, the current tolerance is no more than 500 milliamps. In another embodiment, the threshold current is zero amps. In another embodiment, the rechargeable battery comprises a plurality of sodium-metal-halide cells.

In another embodiment, a method for a rechargeable battery includes applying a charge voltage to the rechargeable battery; monitoring a battery voltage and a battery current of the rechargeable battery; calculating a battery resistance from the battery voltage and the battery current; and identifying a top of charge condition when for a defined time period the battery voltage is within a tolerance of the charge voltage and the calculated battery resistance is greater than a threshold resistance.

In another embodiment, calculating the battery resistance comprises calculating a per cell resistance for a plurality of energy storage cells of the rechargeable battery. In another embodiment, the threshold resistance is 80 milliohms.

In yet another embodiment, a method for a rechargeable battery includes monitoring a battery voltage and battery current of the rechargeable battery; applying a charge voltage to the rechargeable battery at a voltage level that is greater than a float voltage of the rechargeable battery; reducing the charge voltage to the float voltage; and identifying a top of charge condition when for a defined time period the battery voltage is within a voltage tolerance of the float voltage and the battery current is within a tolerance of zero amps.

In another embodiment, the method includes establishing a state of charge of the rechargeable battery when the top of charge condition is identified. In another embodiment, the state of charge is established as 100% when the top of charge condition is identified. In another embodiment, the voltage tolerance is no more than 10 millivolts. In another embodiment, the voltage level is at least 1% greater than the float voltage.

In another embodiment, reducing the charge voltage to the float voltage further includes reducing the charge voltage to the float voltage upon achieving a designated state of charge, reducing the charge voltage to the float voltage after a designated charging time, reducing the charge voltage to the float voltage when the battery current falls below a designated threshold current, or reducing the charge voltage to the float voltage when the battery voltage exceeds a designated threshold voltage.

In another embodiment, the rechargeable battery comprises a plurality of sodium-metal-halide cells.

A rechargeable battery system is also disclosed. In embodiments, the rechargeable battery system includes means for applying a charge voltage to the rechargeable battery; means for monitoring a battery voltage and a battery current of the rechargeable battery; and means for identifying a top of charge condition when for a defined time period the battery voltage is within a voltage tolerance of the charge voltage and the battery current is within a current tolerance of a threshold current.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

The subject matter disclosed herein relates to a rechargeable battery system and method for a rechargeable battery system. Referring generally to FIGS. 1 through 6, embodiments of a rechargeable battery system and method of operating a rechargeable battery system are disclosed.

Figure 1:
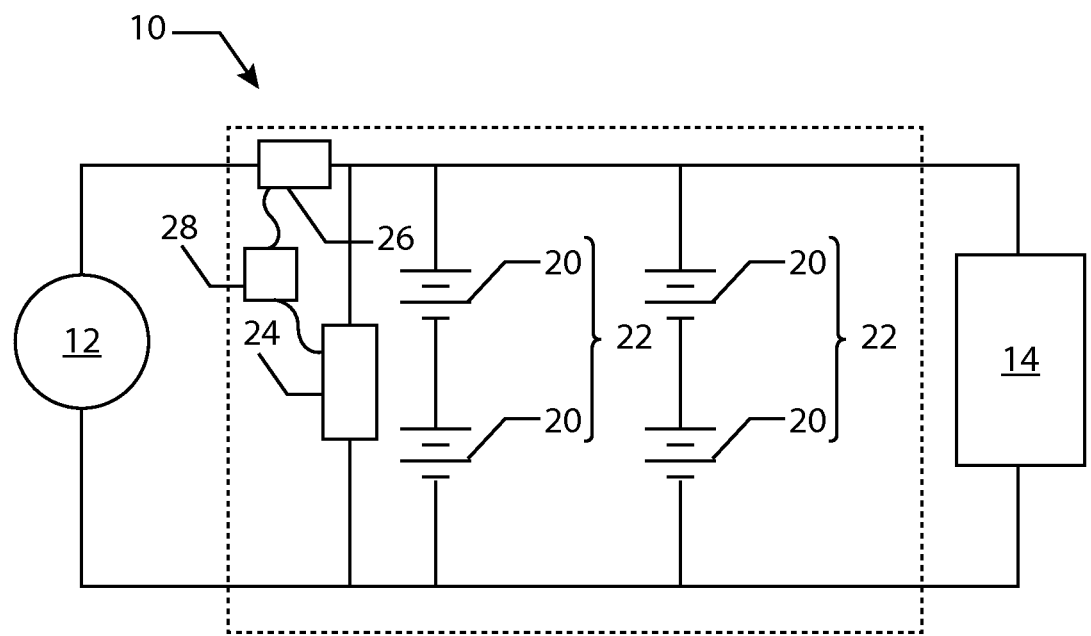
FIG. 1 is a schematic view of a rechargeable battery.

Referring to FIG. 1, an embodiment of a rechargeable battery system is illustrated, which has a rechargeable battery 10 connected between a source 12 and a load 14. The source 12 may be a variety of electrical power generation devices or systems. In one embodiment, the source 12 is a regenerative brake system of a vehicle, such as an automobile or train. In another embodiment, the source 12 is an internal combustion engine in combination with a generator or alternator configured to produce electrical power. In yet another embodiment, the source 12 is an electricity distribution system, such as a national power grid, electric utility or other commercially available electrical supply. In various embodiments, the source 12 may include one or more different sources of electrical power. The source 12 supplies electrical power to the rechargeable battery 10 to recharge or maintain the charge level of the rechargeable battery 10. In addition, the source 12 may supply electrical power directly to the load 14. In some applications, the output of the source 12 may be controlled through the use of voltage regulators, current regulators, or other devices to provide the desired input voltage and current to the rechargeable battery 10 and/or the load 14. The rechargeable battery 10 also supplies electrical power to the load 14, alternately or in combination with the source 12.

In various embodiments, the load 14 includes an electric motor for use with vehicles, such as automobiles or trains, and may include peripheral electrical devices such as lights, audio equipment, heaters, air conditioners or other devices for the vehicles. In other embodiments, the load 14 includes computing equipment, such as network servers, or telecommunications equipment, such as cell phone base stations, and may include environmental control equipment, such as, HVAC systems for heating and/or cooling equipment as needed. In yet another embodiment, the load 14 includes medical equipment requiring a stable input power source provided by the combination of the source 12 and the rechargeable battery 10. In some applications, a variety of loads 14 are connected to one or more rechargeable batteries 10. In various embodiments, the rechargeable battery 10 operates as a backup or redundant electrical supply, such as an uninterruptable power supply, to provide electrical power to a load 14 during interruptions in the availability of a primary energy source. In an embodiment, the power consumption of the load 14 is controllable, so that the power consumption is reduced based upon the power available from the rechargeable battery 10 when the primary energy source is unavailable. In another embodiment, the rechargeable battery 10 stores sufficient power to allow the load 14 to perform a controlled shutdown upon failure of a primary power source. In other embodiments, the rechargeable battery 10 stores sufficient power to operate the load until the primary power source can be restored or a backup power source, such as a generator can be connected and made operational. Additional circuitry, such as fuses and circuit breakers (not shown), are also utilized as necessary for any given application.

As illustrated in FIG. 1, the rechargeable battery 10 includes a plurality of electrochemical cells 20 connected in series forming a cell string 22. The plurality of electrochemical cells 20 configured in a cell string 22 enables the rechargeable battery to provide an output voltage greater than that possible with a single electrochemical cell. In different embodiments, the rechargeable battery 10 may have at least 100, at least 200, or at least 400 rechargeable electrochemical cells 20 in series. In other embodiments, the rechargeable battery 10 includes a plurality of cell strings 22 connected in parallel. The plurality of cell strings 22 provides greater energy storage capacity for the rechargeable battery 10 and may allow a larger power output to be provided to a load 14. In embodiments, the battery 10 also includes a voltage sensor 24 configured to measure the battery voltage, and a current sensor 26 configured to measure battery current. The voltage sensor 24 and current sensor 26 communicate with a battery management system, such as controller 28, and may be used to monitor the operation of the battery. The voltage sensor 24, current sensor 26, and controller 28 may be integrated with or separate from the rechargeable battery 10. In embodiments, the battery management system is further configured to implement one or more of the methods for charging a rechargeable battery presently disclosed.

In one embodiment, the electrochemical cells 20 are sodium-metal-halide cells. In other embodiments, the electrochemical cells 20 may be sodium-halide, sodium-sulfur, lithium-sulfur or other rechargeable electrochemical cells used for energy storage. In addition, one or more types of electrochemical cells may be used as appropriate for a given application. In one embodiment, the electrochemical cells have an operating temperature determined by the melting point of the material utilized in the cells. For example, the operating temperature may be greater than 100 degrees Celsius, such as between 250 degrees Celsius and 400 degrees Celsius, or between 400 degrees Celsius and 700 degrees Celsius, but other operating temperatures are possible.

In embodiments, a method for a rechargeable battery is illustrated. In one embodiment the method includes applying a charge voltage to the rechargeable battery, monitoring a battery voltage and a battery current, and identifying a top of charge condition when for a defined period the battery voltage is within a voltage tolerance of the charge voltage and the battery current is within a current tolerance of a threshold current. The method may also include establishing a state of charge of the rechargeable battery when the top of charge condition is identified.

As used herein, the term charge voltage refers to a voltage applied by a source, such as source 12 to a rechargeable battery 10 to recharge the battery. The term float voltage refers to the voltage at which the rechargeable battery is nominally maintained during normal operations. The term battery voltage may refer to the battery open circuit voltage, which is the voltage between the battery terminal when no load in applied. In some embodiments, battery voltage may refer to other voltage measurements between the battery terminals that are correlated with the battery open circuit voltage. The term battery current refers to the current flowing into or out of the rechargeable battery. In various embodiments, the battery voltage and/or battery current are monitored by a battery management system (not shown) that is configured to monitor and/or control the operation of the rechargeable battery. The term state of charge refers to an indication of the amount of energy stored in a rechargeable battery and is often represented a percentage of the battery's specified maximum capacity. As further explained below, a rechargeable battery may be charged above the battery's specified maximum capacity in which case the state of charge may be indicated as greater than 100%. The term top of charge refers to the state when the charging cycle reaches its desired termination, which is often, but not always, correlated with the rechargeable battery reaching a fully charged state (i.e. state of charge 100%).

Figure 2:
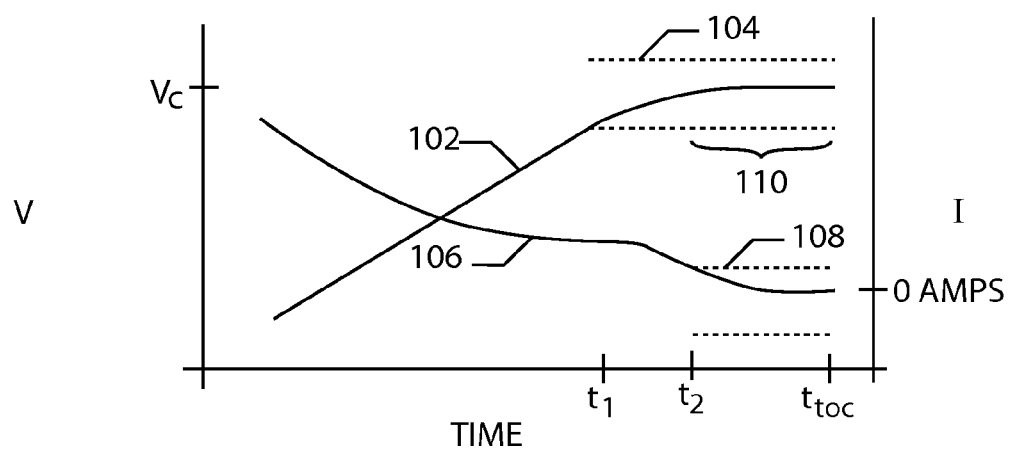
FIG. 2 is a graph of voltage and current during a charging cycle.

Referring now to FIG. 2, the battery voltage 102 and battery current 106 are illustrated on the graph 100 over time during a charging cycle for a rechargeable battery. In the embodiment illustrated in FIG. 2, the charge voltage is equal to the float voltage for the system in which the rechargeable battery is employed. Over time, the battery voltage 102 increases towards the charge voltage as ions within the battery transition from the cathode towards the anode. While the battery voltage 102 increases, the battery current 106 decreases as the internal resistance of the battery rises. Internal resistance of a battery increases during the charging cycle as the battery approaches a fully charged state.

As shown in FIG. 2, the battery voltage 102 approaches the charge voltage and eventually falls within a voltage tolerance 104 of the charge voltage. The battery voltage may approach the charge voltage asymptotically or may fluctuate around the charge voltage depending upon the implementation of the rechargeable battery and the system in which it is used. A voltage tolerance 104 is defined to indicate that the battery voltage 102 is within a determined tolerance of the charge voltage being used. In one embodiment, the voltage tolerance is no more than 10 millivolts per cell (mV/cell), such that for a battery with 100 cells, the battery voltage must be within +/−1000 mV of the charge voltage. In other embodiments, the voltage tolerance may be no more than 5 mV/cell or no more than 1 mV/cell. In other embodiments, less precision may be acceptable, and the voltage tolerance may be no more than 100 mV/cell, no more than 500 mV/cell, or no more than 1 V/cell. As described here, the voltage tolerance is symmetric around the charge voltage, however, in other embodiments, the voltage tolerance may be asymmetric, such as no less than 10 mV/cell below the charge voltage and no more than 50 mV/cell above the charge voltage. In each embodiment, the voltage tolerance 104 defines a range around the charge voltage within which the battery voltage must reside to establish the top of charge condition.

While the battery voltage 102 increases during the charging cycle, the battery current 106 decreases. The battery current 106 is depicted as decreasing during the portion of the charging cycle illustrated. In many embodiments, the battery current 106 is limited during the initial portion of the charging cycle so as not to exceed the capability of the source 12 or the rechargeable battery 10. Once the battery reaches a designated state of charge, the battery current 106 is allowed to decrease as the internal resistance of the battery increases. Analogous to the voltage tolerance 104, a current tolerance 108 is defined to indicate that the battery current 106 is within a designated tolerance of a threshold current. In one embodiment, the battery current approaches zero amps as the battery approaches the top of charge condition, and therefore the threshold current is defined as zero amps. In other embodiments, a small current to or from the battery may be acceptable and the threshold current may be other than zero amps. In each case, current tolerance 108 is defined to indicate when the battery current 106 is within a tolerance of the threshold current. In one embodiment, the current tolerance 108 is no more than 100 milliamps (mA). In other embodiments, the current tolerance may be no more than 10 mA, or no more than 50 mA, no more than 500 mA, or no more than 1 A. The current tolerance, like the voltage tolerance, may be selected based upon the desired application for the rechargeable battery. The current tolerance 108 may also be asymmetric around the threshold current, such as no less than 10 mA below the threshold current and no more than 50 mA above than the threshold current. In each embodiment, however, the current tolerance defines a range around the threshold current within which the battery current must reside to establish the top of charge condition.

In one embodiment, the threshold current is zero amps and the current tolerance is 500 mA, such that the top of charge condition is identified when the battery current falls to 500 mA or less. In other embodiments, the threshold current may be defined as 500 mA, and the current tolerance may be defined as no more than 0 mA above the threshold current, and no more than 500 mA below the threshold current, so that the top of charge condition is also identified when the battery current falls to 500 mA or less. In this manner, the threshold current and current tolerance, like the threshold voltage and tolerance, defines a range in which the current must fall for a top of charge condition to be identified for the rechargeable battery.

In embodiments, the top of charge condition for a rechargeable battery is identified when for a defined time period the battery voltage is within a voltage tolerance of the charge voltage and the battery current is within a current tolerance of a threshold current. As shown in FIG. 2, the battery voltage 102 is within the voltage tolerance 104 of the charge voltage (Vc) beginning at time $T_1$. The battery current 106 however does not fall within the current tolerance 108 of the threshold current until time $T_2$. Beginning at time $T_2$, therefore, the battery voltage is within the voltage tolerance of the charge voltage and the battery current is within the current tolerance of the threshold current, which in this illustration is zero amps. The time period 110 is defined as the duration for which the battery voltage and battery current must each be within their respective tolerances for a top of charge condition to be identified. In one embodiment, the time period 110 is defined as 120 seconds. In other embodiments, the time period may be between 30 seconds and 900 seconds. The time period 110 is selected to be sufficiently long so that the stability of the charging cycle may be determined by the battery voltage and battery current remaining within their desired tolerances. If either the battery voltage or battery current deviation from their desired tolerances, the top of charge condition would not be identified. For example, if the rechargeable battery were discharged between time $T_2$ and time $T_{TOC}$, the battery current would become negative (indicating a discharge current) and fall outside of the current tolerance 108. As such, the top of charge condition would thus not be identified until the discharge was discontinued, and, if necessary, rechargeable battery was recharged until both the battery voltage and battery current were once again within their respective tolerances for the defined time period.

Figure 3:
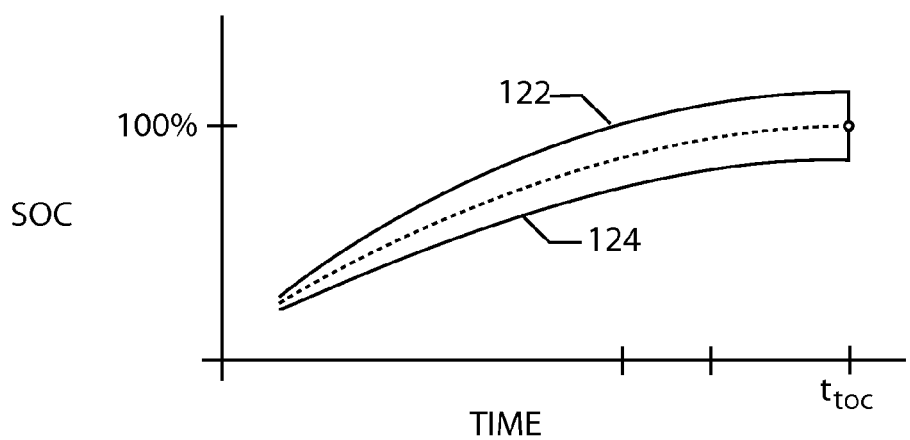
FIG. 3 is a graph of state of charge for a rechargeable battery corresponding to the charging cycle of FIG. 2.

In embodiments, the state of charge of the rechargeable battery is established when the top of charge condition is identified. Referring to FIG. 3, a variety of techniques may be used to track the state of charge of a rechargeable battery. One such technique that has been used is current integration, namely, integrating the current flowing into and out of the rechargeable battery to estimate the remaining charge in the rechargeable battery. Using techniques such as this, the state of charge of a rechargeable battery would be calculated to increase during the charging cycle as the battery current 106 is positive, indicating a flow of current into the rechargeable battery.

The states of charge 122, 124 illustrate two calculated states of charge for the rechargeable battery during the charging cycle illustrated in FIG. 2. Because the charge voltage is equal to the float voltage in the embodiment illustrated in FIG. 2, upon reaching the top of charge, the state of charge for the rechargeable battery is defined as 100%, which corresponds to the battery begin charged to the specified maximum capacity. The calculated state of charge 122, 124, whether determined from current integration, open circuit voltage, or other methods, may not accurately reflect the state of charge at the top of charge due to various errors in the monitoring and calculating of the state of charge. In one example, a state of charge calculated with current integration is susceptible to errors in current measurement. In another example, a state of charge based on open circuit voltage may be inaccurate for those batteries in which open circuit voltage does not vary significantly as the battery approaches a fully recharged state.

In contrast to such prior systems, the methods presently disclosed establish the state of charge of the rechargeable battery when the top of charge condition is identified. As illustrated in FIG. 3, the state of charge 122 is reset to 100% when the top of charge condition is identified at time $T_{TOC}$. In this manner, the method corrects for overestimation of the state of charge, such as illustrated by state of charge 122, and corrects for underestimation of state of charge, such as illustrated by state of charge 124. By establishing the state of charge when the rechargeable battery is in a known state, as indicated by the battery voltage and battery current remaining within their respective tolerances for the defined time period, the state of charge more accurately corresponds to a known available energy capacity of the rechargeable battery. Once the state of charge is established in this manner, the state of charge may be monitored or tracked using a variety of methods as the rechargeable battery is operated through multiple charge and discharge cycles. However, each time the rechargeable battery is recharged to the top of charge condition, the state of charge may be reestablished, corresponding to the known available energy capacity of the rechargeable battery thereby reducing any accumulated errors in the calculated state of charge. In yet other embodiments, once the top of charge condition is reached the system may cease to charge the rechargeable battery, such as by disconnecting the rechargeable battery from the source, allowing the rechargeable battery to remain inactive until needed to supply power to a load, or until sufficient self-discharge has occurred to warrant another recharging cycle.

Figure 4:
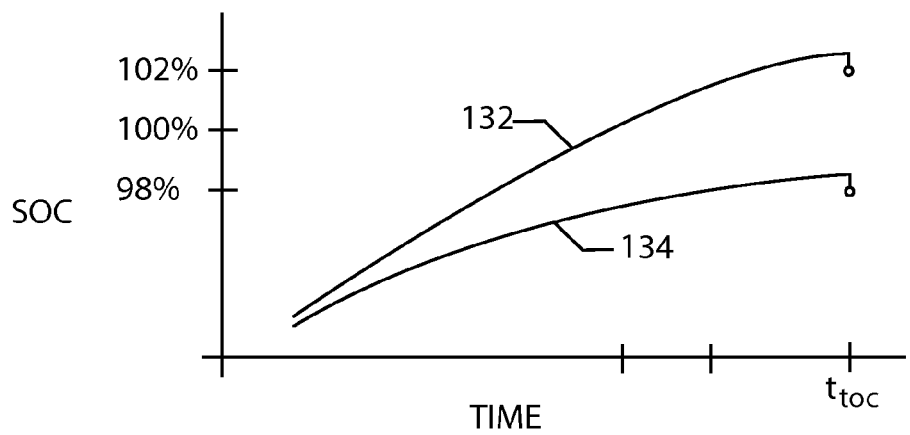
FIG. 4 is a graph of state of charge for a rechargeable battery corresponding to the charging cycle of FIG. 2.

As shown in FIG. 3, the state of charge is established to be 100% when the charge voltage corresponds to the float voltage for the rechargeable battery. Referring now to FIG. 4, when the charge voltage is not the float voltage of the rechargeable battery, the state of charge may be established based on the charge voltage and the float voltage and may be other than 100%. In one embodiment, the charge voltage is two percent greater than the float voltage and the state of charge 132 is established to be 102% at the top of charge. In another embodiment, the charge voltage is 5% less than the float voltage and the state of charge 134 is established to be 95% at the top of charge. By way of illustration, a rechargeable battery 10 may be connected to source 12 that supplies a charge voltage different than the float voltage of the rechargeable battery system. Such a source may be selected for economic or other reasons. The source 12 may be used to charge the rechargeable battery to the top of charge condition and the state of charge may be established to be 95%, 102% or any other appropriate value based on the actual charge supplied to the rechargeable battery. In an embodiment, the rechargeable battery may then be disconnected from the source and reconnected to the load operating at float voltage. The rechargeable battery connected to load may charge or discharge until an equilibrium is reached and the state of charge may be monitored using a variety of methods. In this way, a wider selection of sources may be selected to provide the charge voltage allowing for increased flexibility in the system.

In another embodiment, a method for a rechargeable battery includes applying a charge voltage to the rechargeable battery; monitoring a battery voltage and a battery current; calculating the battery resistance from the battery voltage and the battery current; and identifying a top of charge condition when for a defined time period the battery voltage is within a tolerance of the charge voltage and the calculated battery resistance is greater than a threshold resistance. As previously discussed, after a constant current portion of a charging cycle, the battery voltage and battery current are related by the battery internal resistance. The battery resistance increases as the state of charge increases resulting in a reduction in the battery current such as illustrated in FIG. 2. In an embodiment, the battery resistance may be calculated from the battery voltage and the battery current and compared to a threshold resistance in an analogous manner to the battery current being compared to a threshold current as noted above. In one embodiment, the threshold resistance is no less than 80 milliOhm per cell (mOhm/cell), however in other embodiments, the threshold resistance may be no less than 40 mOhm/cell, no less than 250 mOhm/cell, or no less than 1000 mOhm/cell. In other embodiments, the method may include calculating a per cell resistance for a plurality of energy storage cells of the rechargeable battery. In one embodiment, a per cell resistance of 80 mOhm may be used to identify a top of charge condition corresponding to a voltage of 2.62 volts/cell at 500 mA. In another embodiment, a per cell resistance of 180 mOhm may be used to identify a top of charge condition corresponding to a voltage of 2.67 volts/cell at 500 mA. In some embodiments, each cell or cell string may be provided with a voltage and/or current sensor and the method may accommodate variations between cells or cell strings. In yet other embodiments, determining per cell resistance may facilitate the identification of the defective cells so that appropriate maintenance or repairs may be scheduled.

Figure 5:
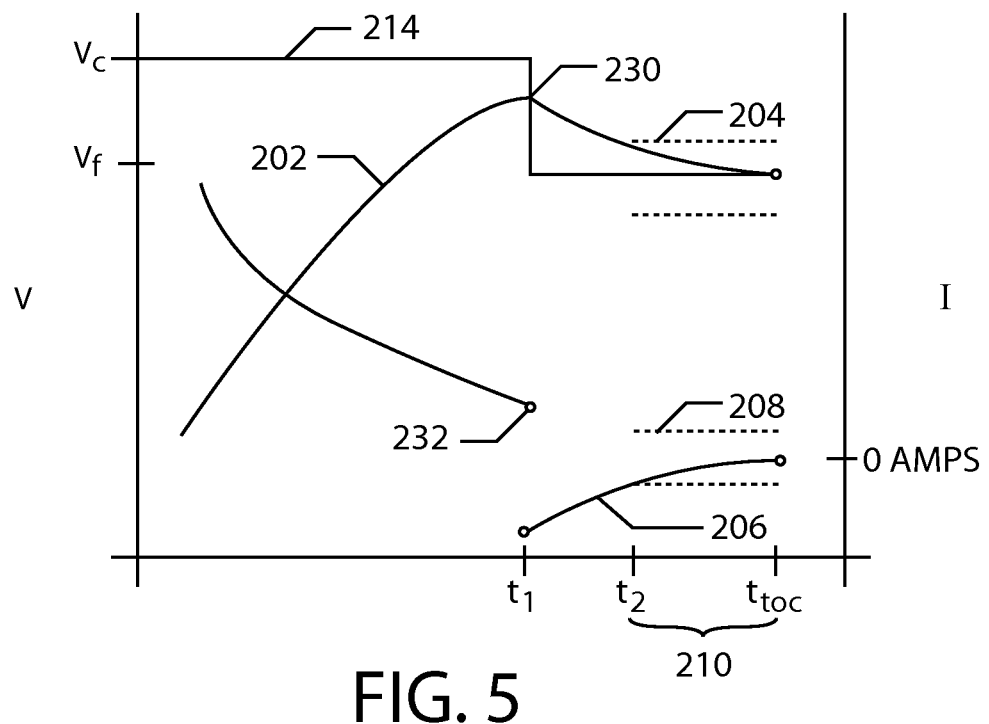
FIG. 5 is a graph of voltage and current during a charging cycle.
Figure 6:
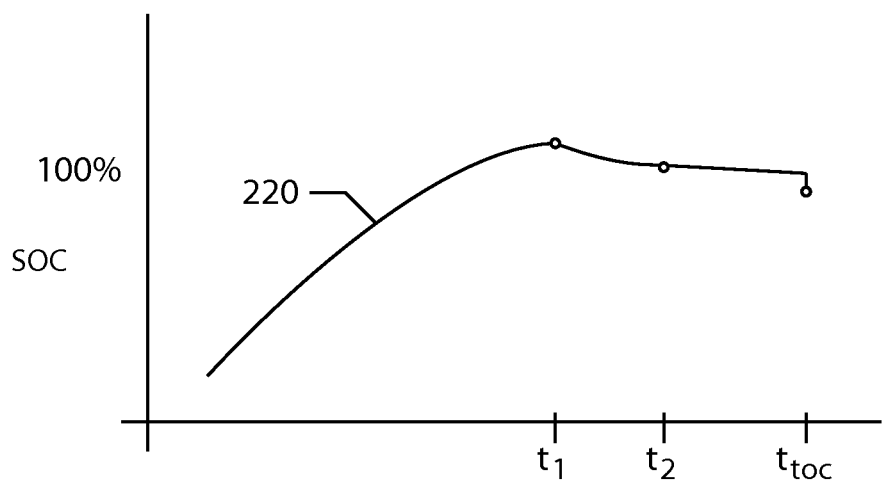
FIG. 6 is a graph of state of charge for a rechargeable battery corresponding to the charging cycle of FIG. 5.

Referring now to FIGS. 5 and 6, another embodiment of a method for a rechargeable battery is disclosed that includes monitoring a battery voltage and battery current of the rechargeable battery, applying a charge voltage to the rechargeable battery at a voltage level that is greater than a float voltage of the rechargeable battery, reducing the charge voltage to the float voltage, and identifying a top of charge condition when for a defined time period the battery voltage is within a voltage tolerance of the float voltage and the battery current is within a tolerance of zero amps. In an embodiment, when the top of charge condition is identified, the state of charge of the rechargeable battery is established to be 100%.

The battery voltage 202 and battery current 206 are illustrated in FIG. 5 during a charging cycle. Also illustrated is the charge voltage. As shown the charge voltage is applied at a first charge voltage 214 greater than the float voltage 216 for the rechargeable battery. In an embodiment, the first charge voltage 214 is at least one percent greater than the float voltage, however a larger or small difference may be used. In embodiments, the first charge voltage 214 may be selected to provide the most efficient charging of the rechargeable battery so that the cost associated with charging the battery may be reduced. When the first charge voltage 214 is applied to the rechargeable battery, the battery voltage 202 increases as the energy stored in the battery increases as previously discussed. At the same time, the battery current 206 decreases as the internal resistance of the battery rises. As shown in FIG. 6, the state of charge 220 of the rechargeable battery also increases during the charging cycle in the same manner as described above.

After applying the first charge voltage 214, the charge voltage is reduced to the float voltage. In embodiments, reducing the charge voltage to the float voltage causes the rechargeable battery to at least partially discharge when the float voltage is lower than the battery voltage. The transition between the first charge voltage 214 and the float voltage 216 may be triggered in a variety of ways. In one embodiment, the charge voltage is reduced to the float voltage when the battery voltage exceeds the float voltage, such as illustrated in FIG. 5 at time $T_1$. In another embodiment, the charge voltage is reduced to the float voltage when the battery voltage reaches a threshold voltage 230. In embodiments, the threshold voltage 230 may be the first charge voltage 214, the float voltage 216, or a voltage between the first charge voltage and the float voltage. In another embodiment, the charge voltage is reduced to the float voltage when the battery current 206 reaches a threshold current 232. In embodiments, the threshold current 232 is selected to reflect that the rate of charging has been reduced indicating that rechargeable battery is near the desired energy storage capacity. In one embodiment, the threshold current 232 is 0.5 A, however, other thresholds may be used depending upon the rechargeable battery and the system in which the battery is employed. In yet another embodiment, the charge voltage is reduced to the float voltage after a designated charging time. A designated charging time may be pre-established for a given rechargeable battery system, or may be determined based on operational parameters such as the state of charge or battery open circuit voltage. As shown on FIG. 5, a charging time ending at time $T_1$ may be selected as the designated charging time at which the charging voltage is to be reduced. In one embodiment, the designated charging time is fifteen minutes, however, longer or shorter charging times may be appropriate depending upon the rechargeable battery and the source used for recharging. In yet another embodiment, the charge voltage is reduced to the float voltage upon achieving a designated state of charge 234, such as illustrated in FIG. 6. In an embodiment, the designated state of charge 234 is greater than 100%, such as 102% or 105% indicating that the rechargeable battery has been charged above the specified maximum capacity of the rechargeable battery. The designated state of charge may be calculated using one or more methods, such as current integration or open circuit voltage.

When the charge voltage is reduced to the float voltage, the rechargeable battery may discharge as illustrated in FIGS. 5 and 6. The battery current 206 switches from positive (charging) to negative (discharging) and the battery voltage 202 beings to fall. In the same manner as previously discussed, the top of charge condition is identified when for a defined time period 210 the battery voltage 202 is within a voltage tolerance 204 of the float voltage 216 and the battery current 206 is within a current tolerance 208 of zero amps. The voltage tolerance 204 and the current tolerance 208 are analogous to those previously described. The time period 210 is similarly analogous to the time period 110. Because the rechargeable battery has been charged above the float voltage and is permitted to discharge, in some embodiments, the time period 210 may be at least 5 minutes, at least 10 minutes or at least 30 minutes, to allow sufficient time for the rechargeable battery to reach equilibrium. In this manner, the state of charge is established as 100% when the top of charge condition is identified. Moreover, the state of charge corresponds to a known available energy capacity of the rechargeable battery under these conditions.

In embodiments, the methods for a rechargeable battery are implemented for rechargeable batteries having a plurality of sodium-metal-halide cells. As the state of charge of the sodium-metal-halide cells increases, the resistance of the cells increases. In order to charge the battery to greater than a 100% state of charge, the charging voltage must be increased resulting in a corresponding increase in the open circuit voltage of the rechargeable battery. The methods presently disclosed facilitate recharging cells such as these while accurately identifying the top of charge and establishing the state of charge as corresponding to a known available energy capacity of the rechargeable battery.

Another embodiment relates to a rechargeable battery system having means for applying a charge voltage to the rechargeable battery, means for monitoring a battery voltage and a battery current, and means for identifying a top of charge condition when for a defined period the battery voltage is within a voltage tolerance of the charge voltage and the battery current is within a current tolerance of a threshold current.

In another embodiment of a method for a rechargeable battery, a method for controlling charging of the rechargeable battery includes applying a charge voltage to the rechargeable battery. The method further includes monitoring a battery voltage and a battery current of the rechargeable battery. This may be done concurrent with applying the charge voltage, or the battery voltage and battery current may be periodically checked at intervals when the charge voltage is (at least temporarily) removed. The method further includes ceasing to apply the charge voltage once it is determined that the rechargeable battery has reached a top of charge condition. The top of charge condition is determined based on the battery voltage being within a voltage tolerance of the charge voltage and the battery current being within a current tolerance of a threshold current, for at least a defined time period. In other words, the charge voltage is applied, the battery voltage and battery current are monitored, and if the battery voltage is within the voltage tolerance of the charge voltage and the battery current is within the current tolerance of the threshold current for the defined time period, then charging is deemed complete, and state of charge of the battery is reestablished.

In another embodiment, a rechargeable battery system is disclosed. The system includes charging means for applying a charge voltage to the rechargeable battery. The charging means may include the source 12. In other embodiments, the charging means include, for example, first circuitry and a first controller coupled to the first circuitry. The first circuitry is coupled to one or more terminals of the rechargeable battery. The first controller is configured to control the first circuitry (e.g., switching on and off of transistors in the first circuitry) for the first circuitry to apply the charge voltage to the rechargeable battery. The rechargeable battery system further includes monitor means for monitoring a battery voltage and a battery current of the rechargeable battery. The monitor means may include the voltage sensor 24 and current sensor 26. In other embodiments, the monitor means may comprise, for example, second circuitry, coupled to the first controller and/or to the battery terminals and/or to the first circuitry, which is configured to output signals corresponding to the battery voltage and battery current, and by which the battery voltage and battery current can be calculated, extrapolated, or otherwise determined. Examples of the second circuitry include diode arrangement, voltage measuring circuits (and related support components), and current measuring circuits (and related support components). The rechargeable battery system further includes identification means for identifying a top of charge condition. The top of charge condition is determined by the identification means, when, for a defined time period, the battery voltage is within a voltage tolerance of the charge voltage and the battery current is within a current tolerance of a threshold current. In other embodiments, the top of charge condition is determined by the identification means, when, for a defined time period the battery voltage is within a voltage tolerance of the float voltage and the battery current is within a tolerance of zero amps The identification means may include a processor or other computational device configured to implement the methods presently disclosed. In other embodiments, the identification means may include, for example, third circuitry and/or a third controller coupled, which may each be coupled to one or more of the monitor means and the charge means. In embodiments, the third circuitry may include digital or analog processing circuitry, and the third controller may include a microprocessor, programmable logic controller, digital signal processor or other computational device capable of identifying a top of charge condition. In various embodiments, a battery management system is provided as part of a rechargeable battery system, where the battery management system provides one or more of the charge means, the monitor means, and/or the identification means. In embodiments, the battery management system also establishes the state of charge of the rechargeable battery when the top of charge condition is identified.

In the specification and claims, reference will be made to a number of terms that have the following meanings The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be." The terms "generator" and "alternator" are used interchangeably herein (however, it is recognized that one term or the other may be more appropriate depending on the application). The term "instructions" as used herein with respect to a controller or processor may refer to computer executable instructions.

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not different from the literal language of the claims, or if they include equivalent structural elements with insubstantial differences from the literal language of the claims.

What is claimed is:

1. A method for a rechargeable battery comprising:
   applying a charge voltage to the rechargeable battery;
   monitoring a battery voltage and a battery current of the rechargeable battery; and
   identifying a top of charge condition when for a defined time period the battery voltage is within a voltage tolerance of the charge voltage and the battery current is within a current tolerance of a threshold current;
   establishing a state of charge corresponding to a known available energy capacity of the rechargeable battery when the top of charge condition is identified, the known available energy capacity being determined based at least in part on the charge voltage and a float voltage of the rechargeable battery.

2. The method of claim 1 further comprising:
   establishing a state of charge of the rechargeable battery when the top of charge condition is identified.

3. The method of claim 2, wherein the state of charge corresponds to a known available energy capacity of the rechargeable battery.

4. The method of claim 2, wherein the charge voltage is a float voltage of the rechargeable battery, and wherein the state of charge is established as 100%.

5. The method of claim 2, wherein the charge voltage is not a float voltage of the rechargeable battery, and wherein the state of charge is established based on the charge voltage and the float voltage.

6. The method of claim 1 further comprising:
   ceasing to charge the rechargeable battery when the top of charge condition is identified.

7. The method of claim 1, wherein the defined time period is no more than 120seconds.

8. The method of claim 1, wherein the voltage tolerance is no more than 10 millivolts per cell of the rechargeable battery.

9. The method of claim 1, wherein the current tolerance is no more than 500 milliamps.

10. The method of claim 1, wherein the threshold current is zero amps.

11. A method for a rechargeable battery comprising:
    applying a charge voltage to the rechargeable battery at a voltage that is greater than a float voltage of the rechargeable battery;
    monitoring a battery voltage and a battery current of the rechargeable battery;
    reducing the charge voltage to the float voltage;
    calculating a battery resistance from the battery voltage and the battery current; and
    identifying a top of charge condition when for a defined time period the battery voltage is within a tolerance of the float voltage and the calculated battery resistance is greater than a threshold resistance.

12. The method of claim 11, wherein calculating the battery resistance comprises calculating a per cell resistance for a plurality of energy storage cells of the rechargeable battery.

13. The method of claim 11, wherein the threshold resistance is 80 milliohms.

14. A method for a rechargeable battery comprising:
monitoring a battery voltage and battery current of the rechargeable battery;
applying a charge voltage to the rechargeable battery at a voltage level that is greater than a float voltage of the rechargeable battery;
reducing the charge voltage to the float voltage; and
identifying a top of charge condition when for a defined time period the battery voltage is within a voltage tolerance of the float voltage and the battery current is within a tolerance of zero amps.

15. The method of claim 14, further comprising:
establishing a state of charge of the rechargeable battery when the top of charge condition is identified.

16. The method of claim 15, wherein the state of charge is established as 100% when the top of charge condition is identified.

17. The method of claim 14, wherein the voltage tolerance is no more than 10 millivolts.

18. The method of claim 14, wherein the voltage level is at least 1% greater than the float voltage.

19. The method of claim 14, wherein reducing the charge voltage to the float voltage further comprises:
reducing the charge voltage to the float voltage upon achieving a designated state of charge.

20. The method of claim 14, wherein reducing the charge voltage to the float voltage further comprises:
reducing the charge voltage to the float voltage after a designated charging time.

21. The method of claim 14, wherein reducing the charge voltage to the float voltage further comprises:
reducing the charge voltage to the float voltage when the battery current falls below a designated threshold current.

22. The method of claim 14, wherein reducing the charge voltage to the float voltage further comprises:
reducing the charge voltage to the float voltage when the battery voltage exceeds a designated threshold voltage.

23. The method of claim 14, wherein the rechargeable battery comprises a plurality of sodium-metal-halide cells.

24. A rechargeable battery system comprising:
means for applying a charge voltage to the rechargeable battery;
means for monitoring a battery voltage and a battery current of the rechargeable battery; and
means for identifying a top of charge condition when for a defined time period the battery voltage is within a voltage tolerance of the charge voltage and the battery current is within a current tolerance of a threshold current;
wherein the rechargeable battery comprises a plurality of sodium-metal-halide cells.

25. A rechargeable battery system comprising:
a rechargeable battery;
a source configured to apply a charge voltage to the rechargeable battery, the charge voltage being greater than a float voltage of the rechargeable battery;
a voltage sensor configured to monitor a battery voltage of the rechargeable battery;
a current sensor configured to monitor a battery current of the rechargeable battery; and
a controller in communication with the voltage sensor and the current sensor, the controller configured to reduce the charge voltage to a float voltage and to identify a top of charge condition of the rechargeable battery when for a defined time period the battery voltage is within a voltage tolerance of the float voltage and the battery current is within a current tolerance of a threshold current.

* * * * *